(12) United States Patent
Kekki et al.

(10) Patent No.: US 6,176,804 B1
(45) Date of Patent: Jan. 23, 2001

(54) PLANETARY GEAR TRAIN FOR A WIND POWER STATION

(75) Inventors: Juha Kekki; Ari Ryymin; Voitto Villgren, all of Jyväskylä (FI)

(73) Assignee: Valmet Voimansiirto Oy (FI)

( * ) Notice: Under 35 U.S.C. 154(b), the term of this patent shall be extended for 0 days.

(21) Appl. No.: 09/334,988

(22) Filed: Jun. 17, 1999

(30) Foreign Application Priority Data

Jun. 18, 1998 (FI) .......................................................... 981414

(51) Int. Cl.[7] .................................................................. F16H 57/08
(52) U.S. Cl. ............................ 475/331; 475/346; 290/55
(58) Field of Search .................................. 475/331, 346; 74/411; 290/55

(56) References Cited

U.S. PATENT DOCUMENTS

| | | | |
|---|---|---|---|
| 3,754,484 | * 8/1973 | Roberts | 475/344 |
| 3,793,899 | 2/1974 | Bourbonnaud . | |
| 3,915,026 | 10/1975 | Otto | 74/401 |
| 4,106,366 | 8/1978 | Altenbokum et al. . | |
| 4,239,977 | * 12/1980 | Strutman | 290/55 |
| 4,331,040 | 5/1982 | Swasey | 74/409 |
| 4,586,400 | * 5/1986 | Nygren | 475/107 |
| 5,140,170 | * 8/1992 | Henderson | 290/55 |
| 5,466,198 | 11/1995 | McKibbin et al. | 475/346 |

FOREIGN PATENT DOCUMENTS

| | | |
|---|---|---|
| 2558093 | 6/1977 | (DE) . |
| 3034443 | 4/1982 | (DE) . |
| 0635639 | 1/1995 | (EP) . |
| 0719964A1 | 7/1996 | (EP) . |
| 0719964B1 | 8/1999 | (EP) . |
| 851921 | 11/1985 | (FI) . |
| 1558033 | 12/1979 | (GB) . |
| 9119916 | 12/1991 | (WO) . |

OTHER PUBLICATIONS

Second International Symposium on Wind Energy Systems; Oct. 3–6, 1978; pp. C6–89–C6–106; BHRA Fluid Engineering, Cranfield, Bedford, England.

* cited by examiner

*Primary Examiner*—Sherry Estremsky
(74) *Attorney, Agent, or Firm*—Steinberg & Raskin, P.C.

(57) ABSTRACT

A planetary gear train for a wind power station having at least one rotatable blade, including a frame, a driven shaft coupled to the frame and rotated by the at least one blade, a planet carrier coupled to the frame and the driven shaft, the planet carrier being structured and arranged to rotate with the driven shaft, at least one planet gear rotatably coupled to the planet carrier, each of the at least one planet gear having helical toothings, a ring gear coupled to the frame and having helical toothings engaging with the toothings of each of the at least one planet gear such that the ring gear is rotatably operative with each of the at least one planet gear, and a sun gear coupled to the frame and having helical toothings engaging with the toothings of each of the at least one planet gear such that the sun gear is rotatably operative with each of the at least one planet gear.

12 Claims, 4 Drawing Sheets

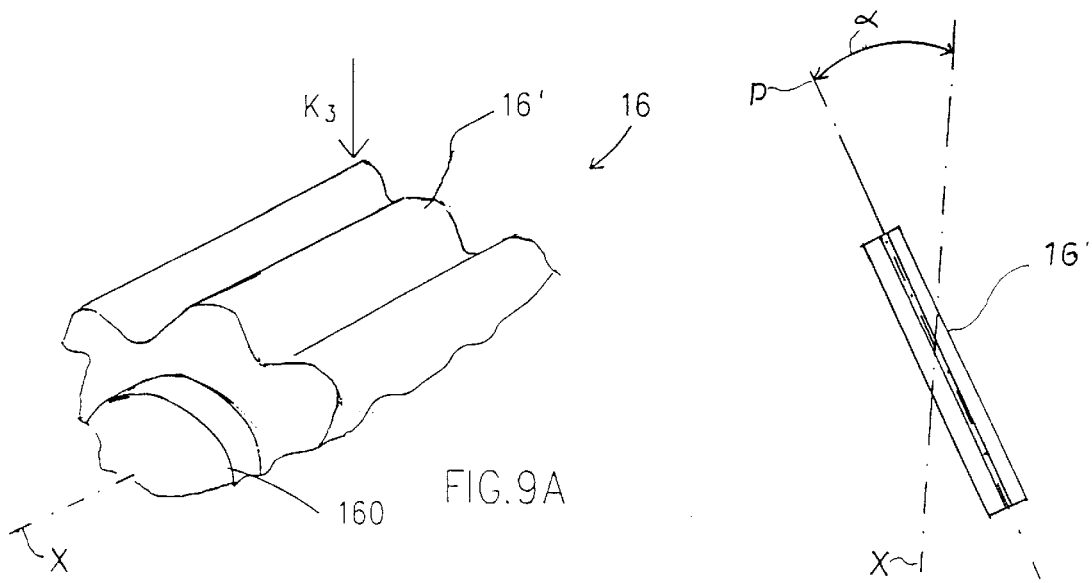
FIG.9A
FIG.9B
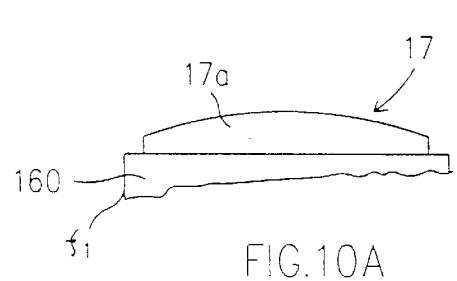
FIG.10A
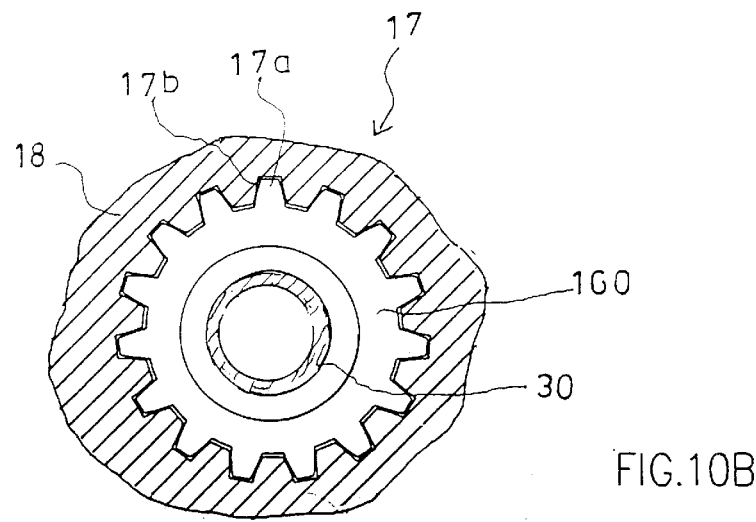
FIG.10B

PLANETARY GEAR TRAIN FOR A WIND POWER STATION

FIELD OF THE INVENTION

The present invention relates generally to planetary gear trains and, more particularly, to planetary gear trains for wind power stations.

BACKGROUND OF THE INVENTION

Transmission constructions are known in which the gear train of a wind power station comprises a driven shaft rotated by at least one blade of the wind power station and a planet gear frame connected with the shaft and which revolves along with the driven shaft. Planet gears of the gear train mesh operationally with a ring gear which is fixedly mounted on the outer end of the gear train. The planet gears also mesh operationally with a sun gear which is located in the center of the gear train and which is rotated by the planet gears. The sun gear further rotates an output shaft by means of intermediate gears or directly, the output shaft being connected to an electric generator of the wind power station for generating electricity.

In the prior art constructions such as that discussed above, the teeth on the planet gears are straight which results in several drawbacks. For example, with such constructions, the noise and vibration levels of the planetary gear train reach undesirable levels.

OBJECTS AND SUMMARY OF THE INVENTION

It is therefore an object of the present invention to provide a planetary gear train which is free from the above-mentioned drawbacks. Specifically, it is an object of the present invention to provide a planetary gear train which has reduced noise and vibration levels resulting from a novel form of the teeth.

These and other objects of the present invention are achieved by the new and improved planetary gear train of the present invention for a wind power station which comprises planet gears having helical teeth such that the teeth run diagonally across the entire mantle face of the gearwheels. Preferably, similar helical teeth are also provided on a central sun gear rotated by the planet gears and on a fixed outermost ring gear.

In accordance with the invention, the sun gear is an oblong shaft which is a floating construction. Thus, the sun gear is permitted to move slightly in an axial direction. At the end of the sun gear shaft, on the frame of a coupling, a flange is provided which receives the axial forces which arise in operation as well as the axial movement of the shaft. The sun gear shaft is an oblong shaft which comprises a center bore through the length thereof, the teeth of the sun gear at one of its ends and a flange that receives the axial forces at the opposite end. The circumferential face of the flange includes one toothing of a gear coupling. A backup flange jointly operative with the flange of the sun gear is located on the frame of the gearbox. A sleeve shaft is coupled, preferably by screw means, to the backup flange and the sun gear shaft is arranged inside the sleeve shaft. The sun gear shaft is connected with the sleeve shaft by the intermediate of a gear coupling. The gear coupling is structured and arranged to permit axial movement between the shaft of the sun gear and the sleeve shaft. By means of the gear coupling, the rotation drive of the sun gear is transferred to the sleeve shaft and to a gearwheel connected with the sleeve shaft and further. The sleeve shaft is further connected with a gearwheel from which the rotation drive is transferred either directly or through one or more intermediate gearwheels to an output shaft and further to an electric generator. By means of sleeves connected with the end of the sun gear shaft, forces in the opposite direction, arising from so-called back strokes, are received. The sleeve, which is provided with a flange, is coupled to the sun gear shaft preferably by means of screws.

The sleeve shaft is placed in a fixed axial/radial position and is mounted on the frame of the gear train preferably by bearing means. The sleeve shaft is coupled to a gearwheel which transfers the drive either directly or through one or more intermediate gearwheels to one or more output shafts, from which the drive is transferred to the electric generator for generating electricity.

In accordance with the invention, a first toothing of the gear coupling is arranged at the end of the sun gear shaft. The first toothing of the sun gear shaft is coupled with the backup or second toothing of the sleeve shaft, i.e., with the second toothing of the gear coupling. The teeth in the gear coupling are straight and crowned in the longitudinal direction of the tooth only, in which case, a certain angular bending is permitted for the sun gear shaft. A relative movement is permitted between the end flange of the sun gear shaft and the backup flange provided on the frame of the gearbox. The end flange of the sun gear shaft and the backup flange revolve at the same speed. An axial movement is permitted between them so that the flanges can reach contact with each other. With such an arrangement, any axial forces arising from the helical toothings on the sun gear, on the planet gears and on the ring gear and an axial movement of the sun gear shaft can be received at the end of the sun gear shaft, whereby this axial movement is restricted.

By means of the helical toothing on the sun gear, a drive of a wind power station is obtained which is highly free from vibrations and free from noise.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 9A illustrates a sun gear having helical toothing;

FIG. 9B shows a tooth of the sun gear of FIG. 9A from the direction of arrow $K_3$ of FIG. 9A;

FIG. 10A illustrates a crowned tooth shape of a straight tooth 17a in a gear coupling 17 between the shafts 16 and 18; and FIG. 10B is a sectional view illustrating the gear coupling 17.

DETAILED DESCRIPTION OF THE INVENTION

Figure 5:
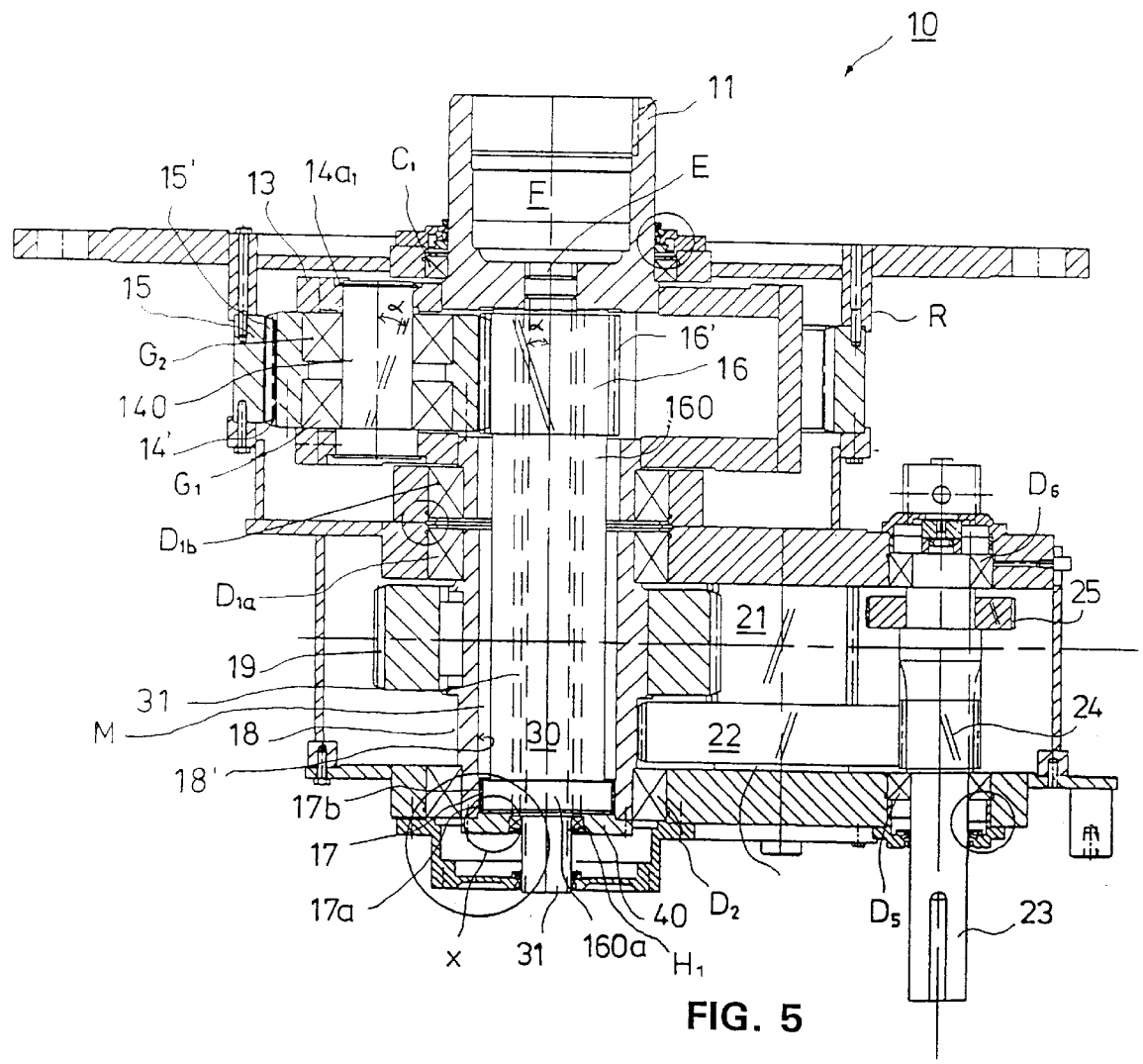
FIG. 5 is a sectional view of the gearbox of FIG. 1 taken along the line 5—5.

Referring now to the drawings wherein like reference characters designate identical or corresponding features throughout the several views, and more particularly to FIGS. 1–5, a planetary gear train 10 is provided which functions along with a wind power station. The wind power station includes one or more blades and the planetary gear train comprises a frame R, and both a planet carrier 13 and a shaft 11 each of which is coupled to frame R and which are connected to one another. The blades of the wind power station (not shown) rotate the planet carrier 13 of the planetary gear train. In addition, the blades of the wind power station rotate the shaft 11 via a rotor, the shaft 11 being connected with the planet carrier 13. The shaft 11 and the connected planet carrier 13 are mounted on the frame R of the planetary gear train by means of the bearing devices $C_1$ and $D_{1b}$ (FIG. 5).

As illustrated in FIG. 5, the driven shaft 11 is a sleeve-like construction part which is fixedly connected with the planet carrier 13 which revolves along with the sleeve shaft 11. The shaft 11 comprises an inside cavity space F and, at the end of the cavity space, a through hole E is formed through the end of the sleeve shaft 11. A shield pipe 30 is passed through the through hole E and a control spindle or rod (not shown) is passed through the shield pipe in order to regulate the blade angle of the rotor.

A rotor shaft is arranged inside the sleeve-shaped shaft 11 of the planet carrier 13. A tightening ring is arranged onto the shaft 11 of the planet carrier 13 in order to lock the shafts into contact with each other.

As further illustrated in FIG. 5, the driven shaft 11 is fixedly connected with the rotated frame 13 of the planetary gear train, i.e. with the planet carrier. At least one planet gear 14$a_1$ is coupled to the planet carrier 13 and is provided with a continuous helical toothing 14' extending across the entire mantle of the gearwheel. While only one planet gear is utilized in the preferred embodiment, a plurality of planet gears may be utilized in other embodiments of the invention. The planet gear 14$a_1$ includes a shaft 140 and is mounted from its shaft 140 by means of bearing devices $G_1$, $G_2$ so that the shaft 140 is fixedly connected with the planet gear frame 13, i.e., with the planet carrier. The planet gear is mounted by means of bearing devices $G_1$, $G_2$ so that it is able to revolve on the shaft 140.

A ring gear 15 comprising a helical toothing 15' is located at the outermost part of the construction, i.e., at an outer end of frame R, and is jointly operative with the helical toothing 14' on the planet gear 14$a_1$. The ring gear 15 is a stationary construction part which is fixedly connected with the frame R. In FIG. 5, the helical inclination of the toothings 16', 14' is illustrated by the angle α.

A sun gear 16 is provided which is rotated by means of the planet gear 14$a_1$. The sun gear 16 comprises a helical toothing 16' extending over its entire circumference, the toothing being jointly operative with the helical toothings 14' of the planet gear 14$a_1$. The sun gear 16 has been formed so that the shaft 160, i.e. the sun gear shaft, is a floating construction part. At one of its ends, the shaft 160 comprises the toothing 16' of the sun gear 16, and at the opposite or second end the shaft comprises an end flange 160a. Gear coupling 17 is arranged at the second end of shaft 160 which is proximate to end flange 160a. The gear coupling 17 is provided with a straight toothing 17a connected with the flange 160a of the shaft 160 and also with a straight toothing 17b provided in the inner cavity space M on the inner mantle face 18' of a separate sleeve shaft 18.

Figure 7:
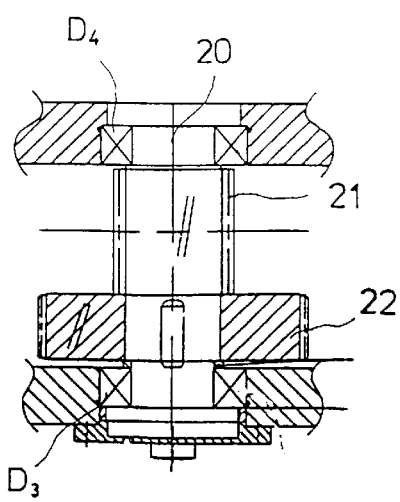
FIG. 7 is a sectional view of the gearbox of FIG. 1 taken along the line 7—7.

The sleeve shaft 18 is mounted in relation to the frame R by means of bearing devices $D_{1a}$ and $D_2$. The sleeve shaft 18 is provided with a gearwheel 19 which is structured and arranged to rotate a shaft 20 by the intermediate of a toothing 21 provided on shaft 20 (FIG. 7). The toothing 21 is preferably formed by direct machining onto the shaft 20. The shaft 20 is mounted on the frame R by means of bearing devices $D_3$ and $D_4$. The shaft 20 is further provided with a gearwheel 22 which is structured and arranged to rotate a first output shaft 23 by the intermediate of a toothing 24 provided on shaft 23. The toothing 24 is formed directly onto the shaft 23. The shaft 23 is 20 mounted on the frame R by means of bearing devices $D_5$, $D_6$.

Further, the shaft 23 is provided with a gearwheel 25, which is structured and arranged to drive a second output shaft 26 (FIG. 8) by the intermediate of a gearwheel 27 fitted on shaft 26. The second output shaft is mounted on the frame R by means of the bearing devices $D_7$, $D_8$.

A shield pipe 31 is passed through a longitudinal bore 30 in the sun gear shaft 160 and is mounted on the frame R by means of a bearing device $H_1$ from its backup flange (FIG. 5). The shield pipe 30 is structured and arranged to revolve with the driven shaft 11 of the planetary gear train and with the sleeve shaft 18. The shield pipe 30 is attached to the planet carrier 13 (by the intermediate of O-rings) at its front end and the shield pipe 30 is mounted on a backup flange 40 (which is attached to the sleeve shaft 18) at its rear end. Thus, the shield pipe 30 revolves at the same speed as the planet carrier and at a different speed as the shafts 160 and 18.

Figure 6B:
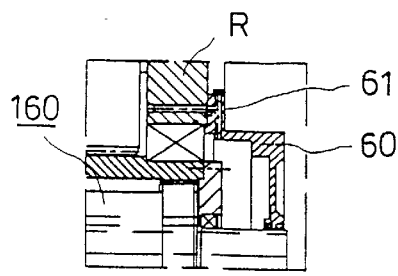
FIG. 6B is a sectional view of the gearbox of FIG. 1 taken along the line 6B—6B.
Figure 6A:
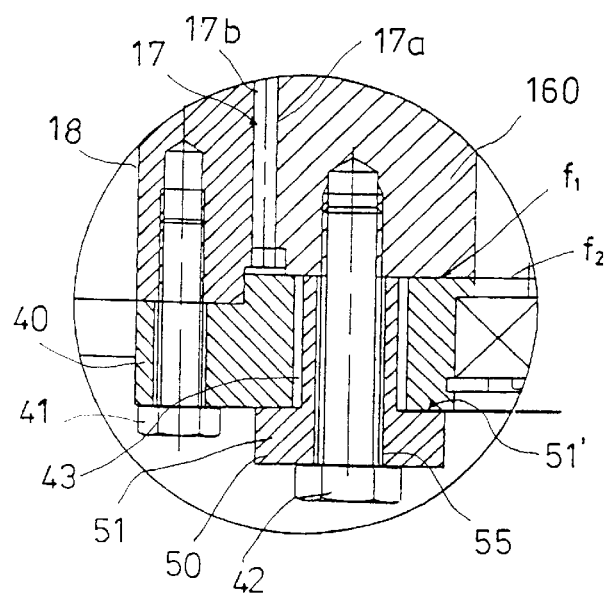
FIG. 6A enlarged view of the area X in FIG. 5.

FIG. 6A is an enlarged illustration of the area X in FIG. 5. As shown in FIG. 6A, the gear train comprises a backup end flange 40 which is attached to the sleeve shaft 18 by screw means 41. Further, the sun gear shaft 160 is displaceably attached to the backup flange 40. A sleeve 50 is passed displaceably through a hole 43 formed in the backup flange 40. A plurality of sleeves 50 can be utilized in accordance with other embodiments of the invention. Screws 42 are passed into the sun gear shaft 160 through a central hole 55 formed in the sleeve 50 thereby fixedly attaching the sleeve 50 to the sun gear shaft 160.

Sleeve 50 includes a sleeve or end flange 51 at its lower end. The distance between the inner face 51' of the end flange 51 of the sleeve 50 and the outer face $f_1$ of the flange 160a of the sun gear shaft 160 is larger than the thickness of the backup flange 40. Thus, the shaft 160 is able to move axially, i.e., over the distance of the gap in relation to the flange 40. The backup faces $f_1$ and $f_2$, both at the end of the sun gear shaft 160 and on the backup flange 40, have been nitrided such that abrasion is prevented when they operate as support faces. Nitriding is a known process in the art of treating materials to prevent abrasion.

In another embodiment of the invention, the sleeve or end flange 51 is structured and arranged to receive back strokes which occur when the blades of the wind power station revolve in the opposite direction. In such an embodiment, the end flange 51 of the sleeve 50, which is connected with the sun gear shaft 160, operates as the backup flange.

Figure 1:
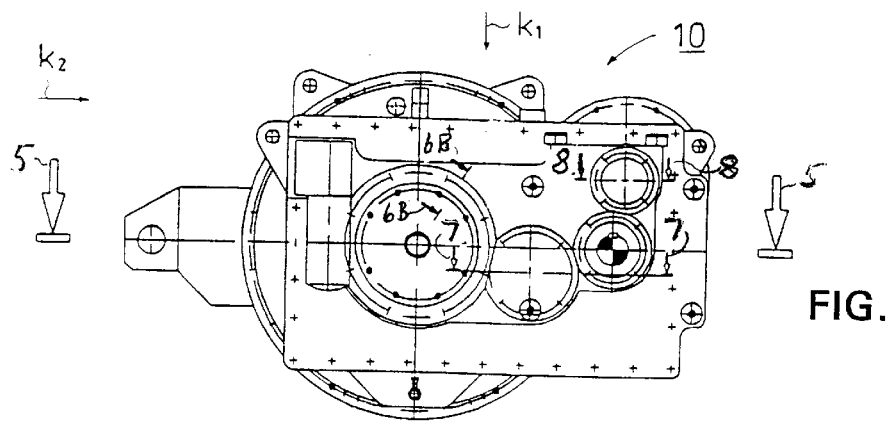
FIG. 1 shows a gearbox in accordance with the invention as viewed from one end of the gearbox.
Figure 2:
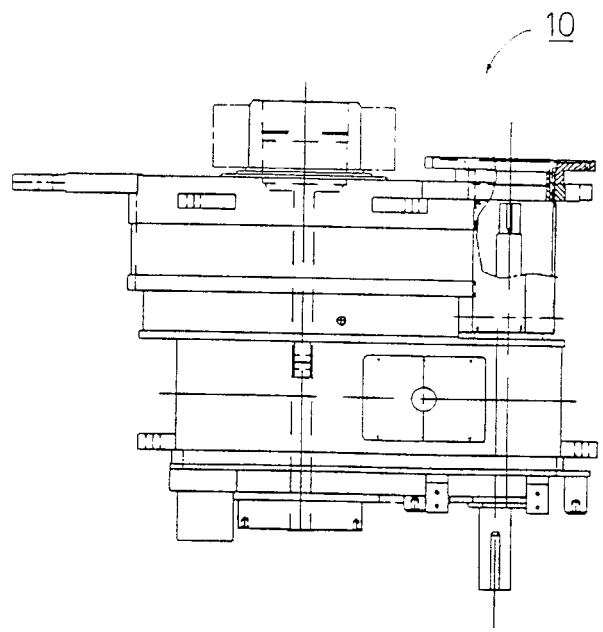
FIG. 2 shows the gearbox of FIG. 1 from the direction of arrow $k_1$.
Figure 3:
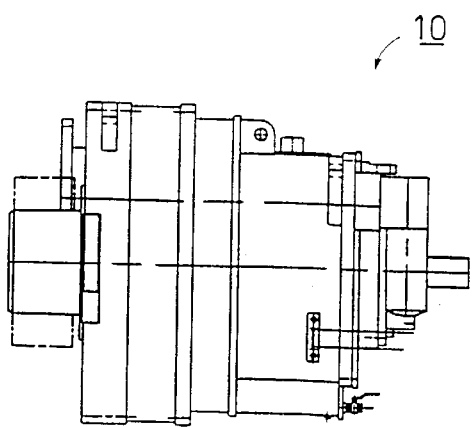
FIG. 3 shows the gearbox of FIG. 1 from the direction of arrow $k_2$.
Figure 4:
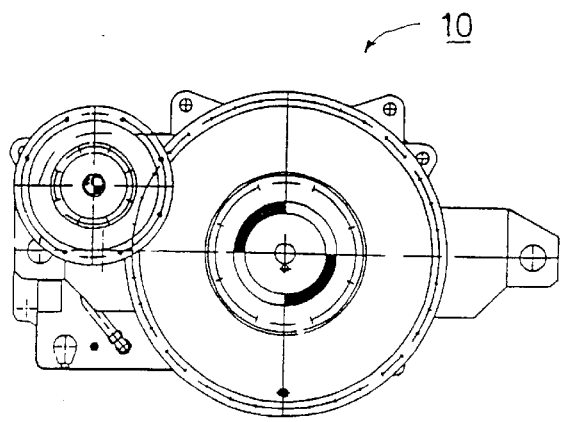
FIG. 4 shows the gearbox of FIG. 1 as viewed from its opposite end.

FIG. 6B, which is a sectional view taken along the line 6B—6B in FIG. 1, illustrates an embodiment of the invention in which the bearing cover 60 is connected to the gearbox frame R by means of screws 61.

FIG. 7 is a sectional view taken along the line 7—7 in FIG. 1. As shown, the drive is transferred from the sleeve shaft 18 to the gearwheel 21 of the shaft 20 and further from the gearwheel 22 to the first output shaft 23.

Figure 8:
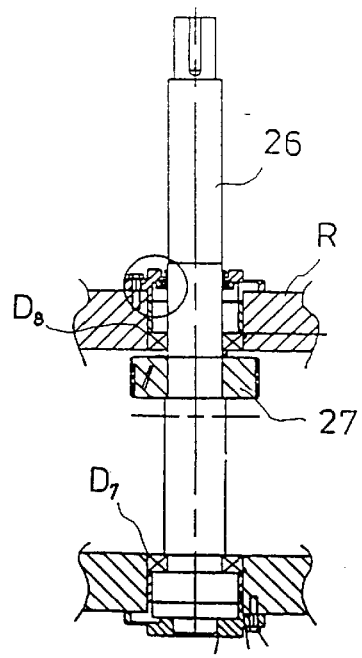
FIG. 8 is a sectional view of the gearbox of FIG. 1 taken along the line 8—8.

FIG. 8 is a sectional view taken along the line 8—8 in FIG. 1. In this embodiment of the invention, the drive to the electric generator is taken from a second output shaft 26. Thus, in accordance with another embodiment of the present invention, the drive is transferred over the gearwheel 25 of the first output shaft 23 to the second output shaft 26 over its gearwheel 27. The drive is then taken to the electric generator from the output shaft 23. The first and the second output shaft 23 and 26 are, however, used selectively so that just one of the drives is on depending on the speed of rotation of the rotor of the wind power station.

FIG. 9A illustrates an inclined or helical toothing 16' connected with the sun gear 16. FIG. 9B shows the toothing as viewed from the top, i.e., in the direction of the arrow $K_3$ in FIG. 9A. Corresponding inclined or helical tooth forms are also provided on the planet gears and on the ring gear. The illustration is a schematic one. The angle of inclination $\alpha$ in relation to the axis X is in a range $30° > \alpha > 0°$ or, if the sense of rotation were the opposite (counterclockwise) $-30° < \alpha < 0°$. Thus, the longitudinal axis p of each tooth 16' is at an oblique angle $\alpha$ in relation to the line of the axis X of rotation.

FIG. 10A is a schematic illustration of the crown form of the straight toothing 17a of the gear coupling 17 placed at the end of the sun gear 160, whereby a certain bending or angular deviation is permitted for the sun gear shaft 160 in operation.

FIG. 10B is a schematic sectional view of the gear coupling 17. The tooth 17a on the flange 160a of the shaft 160 is fitted in the groove 17b in the sleeve shaft 18.

Obviously, numerous modifications and variations of the present invention are possible in light of the teachings hereof. Therefore, it is to be understood that the invention can be varied from the detailed description above within the scope of the claims appended hereto.

We claim:

1. A planetary gear train for a wind power station, the wind power station having at least one rotatable blade, comprising:
   a frame;
   a driven shaft coupled to said frame and rotated by the at least one blade;
   a planet carrier coupled to said frame and said driven shaft, said planet carrier being structured and arranged to rotate with said driven shaft;
   at least one planet gear rotatably coupled to said planet carrier, each of said at least one planet gear having helical toothings;
   a ring gear coupled to said frame and having helical toothings engaging with said toothings of each of said at least one planet gear such that each of said at least one planet gear is rotatably operative with said ring gear; and
   a sun gear coupled to said frame and having helical toothings engaging with said toothings of each of said at least one planet gear such that said sun gear is rotatably operative with each of said at least one planet gear;
   wherein said sun gear comprises a sun gear shaft having a first end and a second end, said first end comprising said toothings of said sun gear and said second end having a backup flange coupled thereto; and
   wherein said second end of said sun gear shaft is structured and arranged to receive a force created by said helical toothings of said sun gear.

2. The planetary gear train as in claim 1, wherein said ring gear is coupled at an outer end of said frame in a stationary position and said sun gear is coupled substantially at a center of said frame.

3. The planetary gear train as in claim 1, wherein
   each of said at least one planet gear has a mantle face and said toothings of each of said at least one planet gear are arranged over the entire mantle face of each of said planet gear;
   said ring gear has a mantle face and said toothings of said ring gear are arranged over the entire mantle face of said ring gear;
   said sun gear has a mantle face and said toothings of said sun gear are arranged over the entire mantle face of said sun gear; and
   the angle of inclination of said toothings of said at least one planet gear, said ring gear and said sun gear in relation to the central axis of said respective gears is in a range of about $-30°$ to $30°$.

4. The planetary gear train as in claim 1, wherein said second end of said sun gear shaft comprises an end flange coupled thereto, said end flange having an outer face which is structured and arranged to support said backup flange.

5. The planetary gear train as in claim 1, further comprising at least one sleeve having a flange and being coupled to said sun gear shaft, said at least one sleeve being passed through at least one hole formed in said backup flange such that a distance between the inner face of said sleeve flange and the second end of said sun gear shaft is larger than a thickness of said backup flange thereby permitting axial movement of said sun gear shaft.

6. The planetary gear train as in claim 5, further comprising
   a sleeve shaft arranged substantially around said sun gear shaft, said sleeve shaft being coupled to said frame;
   a first toothing of a gear coupling located at said second end of said sun gear shaft; and
   a second toothing of said gear coupling located on an inner face of said sleeve shaft such that a drive force is transferred from said sun gear shaft through said gear coupling to said sleeve shaft, the first and second toothings of said gear coupling being direct toothings such that axial movement of said sun gear shaft is permitted.

7. The planetary gear train as in claim 6, further comprising
   a gear coupled to said sleeve shaft;
   at least one intermediate gear rotatably operative with said gear; and
   an output shaft coupled to said at least one intermediate gear, said output shaft being structured and arranged to transfer said drive force to an electric generator for generating electricity.

8. The planetary gear train as in claim 6, further comprising coupling means for coupling said sleeve shaft to said backup flange.

9. The planetary gear train as in claim 8, wherein said coupling means comprise screws.

10. The planetary gear train as in claim 1, further comprising a shield pipe located within an oblong bore formed in said sun gear shaft; and a control rod located within said shield pipe, said control rod being structured and arranged to regulate a blade angle of said at least one blade of the wind power station.

11. The planetary gear train as in claim 1, wherein the end face of said sun gear shaft and the end face of said backup flange are nitrided such that abrasion of the end faces is prevented when the end faces are in end-to-end contact with each other.

12. A planetary gear train for a wind power station, the wind power station having at least one rotatable blade, comprising:

a frame;

a driven shaft coupled to said frame and rotated by the at least one blade;

a planet carrier coupled to said frame and said driven shaft, said planet carrier being structured and arranged to rotate with said driven shaft;

at least one planet gear rotatably coupled to said planet carrier, each of said at least one planet gear having helical toothings;

a ring gear coupled to said frame and having helical toothings engaging with said toothings of each of said at least one planet gear such that said each of said at least one planet gear is rotatably operative with said ring gear; and a sun gear coupled to said frame and having helical toothings engaging with said toothings of each of said at least one planet gear such that said sun gear is rotatably operative with each of said at least one planet gear;

wherein said sun gear comprises a sun gear shaft having a first end and a second end, said first end comprising said toothings of said sun gear and said second end having a backup flange coupled thereto;

wherein said second end of said sun gear shaft is structured and arranged to receive a force created by said helical toothings of said sun gear;

a sleeve shaft arranged substantially around said sun gear shaft, said sleeve shaft being coupled to said frame;

a first toothing of a gear coupling located at said second end of said sun gear shaft; and a second toothing of said gear coupling located on an inner face of said sleeve shaft such that a drive force is transferred from said sun gear shaft through said gear coupling to said sleeve shaft, the first and second toothings of said gear coupling being direct toothings such that axial movement of said sun gear shaft is permitted;

a gear coupled to said sleeve shaft;

at least one intermediate gear rotatably operative with said gear; and an output shaft coupled to said at least one intermediate gear, said output shaft being structured and arranged to transfer said drive force to an electric generator for generating electricity.

* * * * *